US012754573B2

(12) United States Patent
Gautier Graindorge et al.

(10) Patent No.: US 12,754,573 B2
(45) Date of Patent: Oct. 6, 2026

(54) THERMOSTATIC VALVE HAVING A SLEEVE

(71) Applicant: VERNET, Ollainville (FR)

(72) Inventors: Guillaume Gautier Graindorge, Montigny le Bretonneux (FR); Thierry Maraux, Les Clayes sous Bois (FR)

(73) Assignee: VERNET, Ollainville (FR)

( * ) Notice: Subject to any disclaimer, the term of this patent is extended or adjusted under 35 U.S.C. 154(b) by 0 days.

(21) Appl. No.: 18/879,487

(22) PCT Filed: Jun. 28, 2023

(86) PCT No.: PCT/EP2023/067664
§ 371 (c)(1),
(2) Date: Dec. 27, 2024

(87) PCT Pub. No.: WO2024/003144
PCT Pub. Date: Jan. 4, 2024

(65) Prior Publication Data
US 2026/0126820 A1 May 7, 2026

(30) Foreign Application Priority Data
Jun. 29, 2022 (FR) ....................................... 2206544

(51) Int. Cl.
*G05D 23/02* (2006.01)
*F01P 7/16* (2006.01)
(Continued)

(52) U.S. Cl.
CPC .............. *G05D 23/02* (2013.01); *F01P 7/167* (2013.01); *F16K 17/003* (2013.01); *F16K 17/38* (2013.01)

(58) Field of Classification Search
CPC ..... G05D 23/022; F16K 17/003; F16K 17/38; F01P 7/16; F01P 2007/146
See application file for complete search history.

(56) References Cited

U.S. PATENT DOCUMENTS 4,055,298 A 10/1977 Wilson
2013/0240634 A1* 9/2013 Auweder ................. F01P 7/16
236/34.5

(Continued)

OTHER PUBLICATIONS

International Search Report issued in International Application No. PCT/EP2023/067664, mailed on Oct. 9, 2023.

(Continued)

*Primary Examiner* — Kelsey E Cary
(74) *Attorney, Agent, or Firm* — Knobbe, Martens, Olson & Bear, LLP

(57) ABSTRACT

A valve includes a thermostatic element made of thermally expandable material, including a fixed part, fixedly connected to a housing, and a movable part, movable along an axis. The valve further includes a plug movable axially relative to a plug seat, fixedly supported by the housing, to control a flow of fluid between two chambers of the housing. The valve further includes a sleeve movable along the axis between a first configuration, wherein the sleeve is pressed against a sleeve seat fixedly supported by the housing distinctly from the plug seat, to prevent the fluid from flowing between the two chambers, and a second configuration, wherein the sleeve is moved away from the sleeve seat. The plug is connected to the movable part and to the sleeve so that during the expansion of the thermally expandable material, the movable part opens the plug to an intermediate position.

11 Claims, 12 Drawing Sheets

(51) Int. Cl.
*F16K 17/00* (2006.01)
*F16K 17/38* (2006.01)

(56) References Cited

U.S. PATENT DOCUMENTS

| | | | | |
|---|---|---|---|---|
| 2017/0220056 | A1 | 8/2017 | Grumer et al. | |
| 2022/0413524 | A1* | 12/2022 | Louboutin | G05D 23/022 |

OTHER PUBLICATIONS

Preliminary Search Report issued in French Application No. 2206544, dated Jan. 27, 2023.

* cited by examiner

THERMOSTATIC VALVE HAVING A SLEEVE

FIELD

The present invention relates to a thermostatic sleeve valve.

BACKGROUND

Thermostatic sleeve valves are valves with a sleeve, which controls the flow of a fluid through the valve housing and is controlled in displacement by a thermostatic element designed to move and thereby mechanically drive the sleeve depending on the temperature to which the thermostatic element is subject. Thermostatic sleeve valves typically equip cooling circuits belonging to motorizations of large cubic capacities, in particular same used in trucks and certain motor vehicles, for which the flow-rates of cooling fluid necessary for the operation thereof are higher than same encountered for motorizations of smaller cubic capacities, for which the thermostatic valves used are rather plug valves. In fact, the sleeve is a so-called balanced shutter, i.e. a shutter for which the difference in the pressures prevailing on either side of the tubular body of the sleeve is substantially zero according to the direction of displacement of the sleeve by the thermostatic element. On the other hand, the flap is a shutter, the generally flat body of which extends generally perpendicular to the direction of displacement of the plug by the thermostatic element, so that the difference in the pressures prevailing on either side of the flap along said direction reaches high values, especially when the flow of fluid is interrupted by the plug.

Thereof being said, existing thermostatic sleeve valves have the drawback that, at the opening thereof, i.e. when the sleeve is driven by the thermostatic element from a closed configuration, where the sleeve is pressed axially against a seat to prevent fluid flow from passing through the seat, to an open configuration, where the sleeve is moved away from the seat to allow fluid to flow through the seat, the fluid flow-rate suddenly changes from a zero value to a substantial value. Such a variation in flow downstream of the seat associated with the sleeve can be detrimental to regulation by the thermostatic element and, more generally, to the stability of flows in the cooling circuit to which the valve belongs. In other words, the opening of thermostatic sleeve valves is not gradual or is just slightly gradual. To overcome such problem, a well-known solution is to reduce as much as possible the speed of displacement of the sleeve by the thermostatic element when the sleeve changes from the closed configuration to the open configuration, but it is difficult to control the speed of displacement precisely, especially since the diameter of the tubular body of the sleeve can be large. It is also possible to envisage a solution with throttling, i.e. with a passage section with progressive opening as a function of the travel of the sleeve, which is expensive to implement and limited in terms of result. Another solution is to dispense with the use of a sleeve in favor of plurality of staged plugs, which nevertheless induces economic constraints, as well as constraints in the design of the valve.

U.S. Pat. No. 2017/220056 discloses a thermostatic valve having a geometric longitudinal axis. The valve comprises both a thermostatic element, including a movable piston and a fixed thermosensitive body, and two valve units, namely a first valve unit and a second valve unit, which are axially movable relative to each other. More precisely, the first valve unit comprises a first tubular body, which is centered on the axis and which, at one of the axial ends thereof, fixedly supports a first seat. The first valve unit further comprises a first shutter, which is movable in translation along the axis relative to the first tubular body so as to bear against/move away from the first seat to respectively interrupt/allow a first fluid flow. To this end, the first shutter is fixedly connected to the piston of the thermostatic element, whereas a first return spring is interposed axially between the first shutter and the first tubular body, so that the first shutter moves away from the first seat when the thermostatic element deploys, overcoming the resistance of the first return spring. The second valve unit comprises a second tubular body, which is centered on the axis and which fixedly supports a second seat. The second valve unit further comprises a second shutter which is axially movable in translation relative to the second tubular body so as to bear against/move away from the second seat to correspondingly interrupt/permit a second flow of fluid which is different from the first flow of fluid. To this end, provision is made for (i) the second tubular body to be fixedly connected to the thermosensitive body of the thermostatic element, (ii) the second shutter to be fixedly connected to the first tubular body of the first valve unit, (iii) the first tubular body to be mounted so as to be movable in translation along the axis inside of the second tubular body of the second valve unit, and (iv) a second return spring to be axially interposed between the second shutter and the second tubular body, so that the shutter moves away from the second seat when the thermostatic element deploys overcoming the resistance of the second return spring. U.S. Pat. No. 2017/220056 envisages different modes of operation of the valve thereof, depending on whether the first return spring is less stiff, or else as stiff, or else stiffer than the second return spring: when the first return spring is less stiff than the second return spring, the first shutter opens before the second shutter; when the first and second return springs have substantially the same stiffness, the first and second shutters open concomitantly; when the first return spring is stiffer than the second shutter, the second shutter opens before the first shutter.

SUMMARY

The goal of the present invention is to propose a new thermostatic valve which, while using a sleeve to regulate high flow-rates, can be opened more progressively.

To this end, the subject matter of the invention is a thermostatic valve as defined in claim 1.

The idea underlying the invention is to associate a plug with a sleeve and to use a single thermostatic element to control the displacement of both the sleeve and the plug, but by ensuring that the displacement of the thermostatic element during the expansion of the thermally expandable material, thereof drives only the plug at first, which then opens the flow of fluid through the thermostatic valve according to the invention with a low and controlled flow-rate, then, secondly, drives the sleeve which had remained immobile at first, thereby increasing the flow-rate of the circulation of fluid through the valve. To this end, the invention provides that, during expansion of the thermally expandable material, the sleeve is displaced not directly by the thermostatic element, but by the valve which is driven directly by the thermostatic element, the displacement of the sleeve by the plug being effective only after the plug has reached a predetermined position wherein same is moved away from the seat associated thereto. Thereby, the curve of the flow-rate of the circulation of fluid through the valve according to the invention, as a function of the deployment of the thermostatic element, consists of two successive sections, namely a first section, which is determined by the law of opening of the single plug, and then a second section, which is determined by the combination of the respective laws of opening of the plug and of the sleeve. To adapt the flow-rate curve, it is possible to play on different structural parameters of the valve, namely, among others, the respective diameters of the plug and of the sleeve, the stroke over which the plug is moved to open without the sleeve still moving, and the respective geometrical shapes of the plug and of the seat associated with the latter, these geometrical shapes moreover advantageously having a throttling effect on the flow of fluid flowing between the seat and the plug in the open configuration. In practice, as discussed in detail thereafter, various embodiments of the valve according to the invention can be envisaged, in particular by integrating therein advantageous optional arrangements aimed at further improving certain aspects of the valve.

Advantageous additional features of the valve according to the invention are specified in the others claims.

BRIEF DESCRIPTION OF THE DRAWINGS

The invention will be better understood upon reading the following description, given only as an example and making reference to the drawings, wherein.

DETAILED DESCRIPTION

Figure 1:
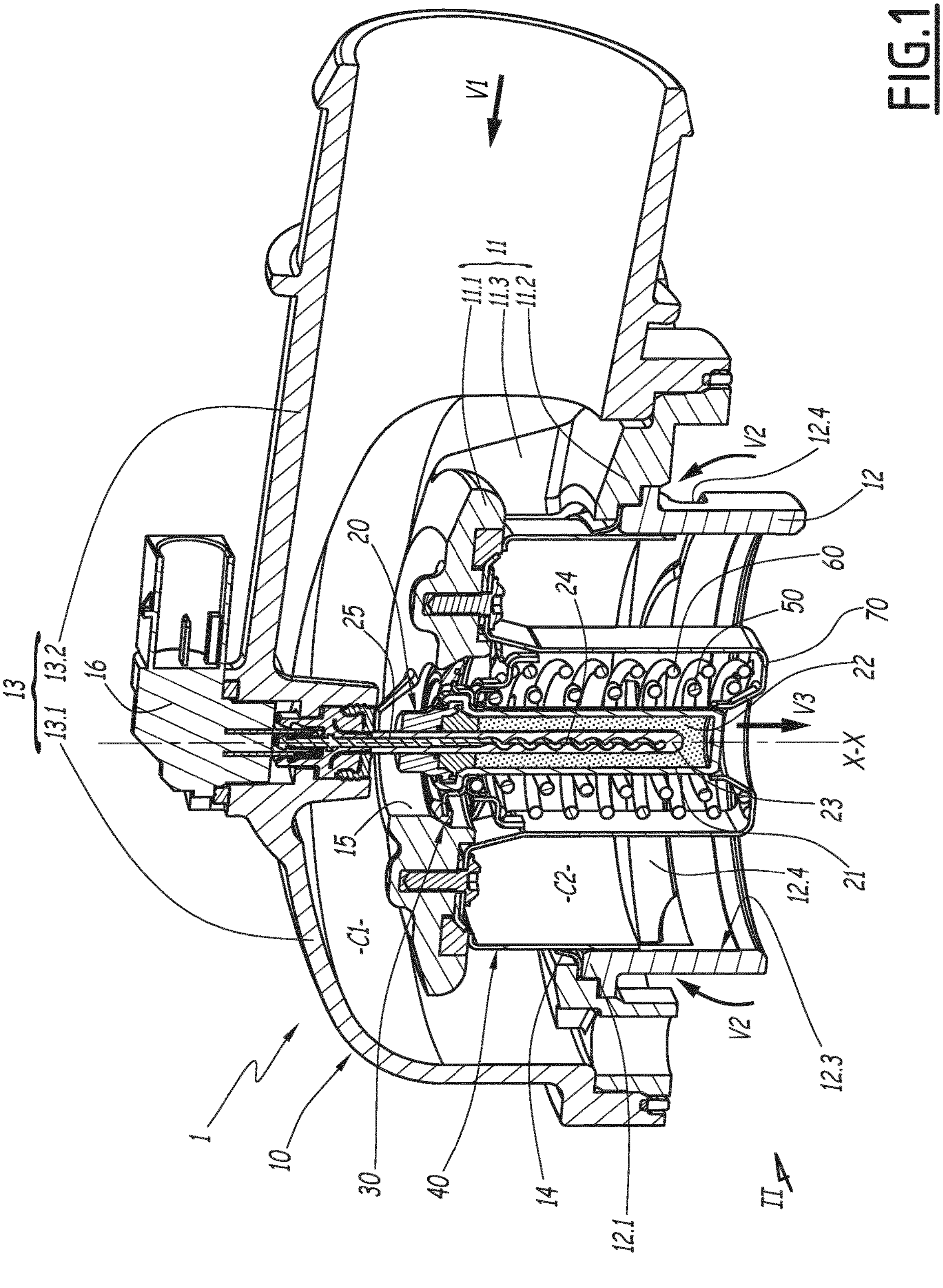
FIG. 1 is a perspective view of a first embodiment of a thermostatic valve according to the invention, represented in half-section.

FIGS. 1 to 4 show a thermostatic valve 1 for regulating the circulation of a fluid. The fluid is in particular a cooling fluid the nature of which is not limiting. The thermostatic valve 1 belongs e.g, to a cooling circuit of an engine, such as an internal combustion engine of a vehicle, or to an oil circuit of a gearbox, etc.

As an example of application of the thermostatic valve 1, which will be discussed again thereafter, the thermostatic valve 1 is a so-called three-way valve, the channels being divided into two inlet channels, which are denoted by V1 and V2 in the figures and through which fluid enters the thermostatic valve 1, and an outlet channel, which is denoted by V3 and through which fluid leaves the thermostatic valve 1. The fluid leaving the thermostatic valve 1 is sucked in, via the outlet channel V3, by a pump of the cooling circuit to which the thermostatic valve 1 belongs, before being delivered by the pump to a member to be cooled, typically a motor. The fluid coming from the member to be cooled is returned by the cooling circuit to the thermostatic valve 1 either directly, via the inlet channel V2, or by passing first through a heat exchanger, typically a radiator, before being sent to the thermostatic valve 1 via the inlet channel V1. It is understood that the inlet channel V2 forms, with respect to the aforementioned heat exchanger, a bypass for the fluid, the inlet channel V2 being typically called a bypass channel. Of course, the example of application envisaged above is not limiting in the sense that the thermostatic valve 1 can be used in other contexts of application, depending on whether each of the channels V1, V2 and V3 is an inlet channel or an outlet channel with respect to the thermostatic valve 1.

As can be seen clearly in FIGS. 1 to 4, the thermostatic valve 1 includes a housing 10, a thermostatic element 20, a plug 30 and a sleeve 40. In addition, the thermostatic valve 1 defines a geometric axis X-X around which and along which the components of the thermostatic valve are arranged, as discussed in detail hereinafter.

The housing 10 channels the flows of fluid through the thermostatic valve 1, which are regulated by the other components of the thermostatic valve, by distributing fluid between the different channels V1, V2 and V3.

The housing 10 mainly includes a seat body 11, a tubular body 12 and a cover 13, which are fixedly assembled to one another by any appropriate means.

The seat body 11 includes two main walls 11.1 and 11.2, each of which has a generally annular shape, centered on the axis X-X. The main walls 11.1 and 11.2 are situated at different respective levels along the axis X-X, being connected to each other by arms 11.3 of the seat body 11. The arms 11.3 extend lengthwise in a way overall parallel to the axis X-X and are distributed around the axis, providing therebetween, wide through openings along the direction peripheral to the axis X-X.

The main wall 11.1 fixedly supports two distinct seats, both of which are centered on the axis X-X, namely a plug seat 11.5, which is provided to cooperate with the plug 30, as discussed in detail below, and a sleeve seat 11.6, which is provided to cooperate with the sleeve 40, as explained in greater detail thereafter. In orthogonal projection on a geometric plane perpendicular to the axis X-X, the plug seat 11.5 is advantageously inscribed inside the sleeve seat 11.6; in other words, the diameter of the sleeve seat 11.6 is greater than the diameter of the plug seat 11.5. In the embodiment considered in the figures, the plug seat 11.5 is arranged on the inner periphery of the main wall 11.1, while the sleeve seat 11.6 is arranged on the face of the main wall 11.1, oriented axially toward the main part 11.2.

In practice, multiple embodiments can be envisaged for the plug seat 11.5 and the sleeve seat 11.6. In the example envisaged in the figures, the plug seat 11.5 is formed directly by the material forming the main wall 11.2, in the form of a frustoconical surface centered on the axis X-X and diverging toward the main wall 11.2; the sleeve seat 11.6 is formed by a flexible lining which is fixedly directly mounted to the main wall 11.1, in the form of a flat surface which is inscribed in a geometric plane perpendicular to the axis X-X.

The tubular body 12 is centered on the axis X-X and extends along the axis from one of the two opposite axial ends 12.1 and 12.2, the axial end 12.1 being oriented toward the seat body 11. At the axial end 12.1, the tubular body 12 opens out inside the seat body 11, herein in the inner periphery of the main wall 11.2. At the axial end 12.2, the tubular body 12 opens out to the outside of the housing 10 along the axis X-X, herein into the channel V3. Furthermore, the tubular body 12 has faces which are opposite one another radially to the axis X-X, namely an inner face which is oriented towards the axis X-X, and an outer face. The inner face of the tubular body 12 includes a cylindrical surface 12.3, which is centered on the axis X-X and which extends from the axial end 12.1 to the axial end 12.2.

The tubular body 12 is fixedly rigidly attached to the seat body 11, herein at the main wall 11.2 of the latter. To this end, in the embodiment considered in FIGS. 1 to 4, the axial end 12.1 of the tubular body 12 is received and fastened to the main wall 11.2, in particular on the inner periphery of the latter, by being e.g. fitted into a shoulder of the main wall 11.2.

For reasons which will become apparent later, the housing 10 is advantageously equipped with a sealing lip 14 made of a flexible material, such as PTFE. The sealing lip 14 is held in place by pinching directly between the seat body 11 and the tubular body 12, more precisely herein between the main wall 11.2 of the seat body 11 and the axial end 12.1 of the tubular body 12.

Figure 2:
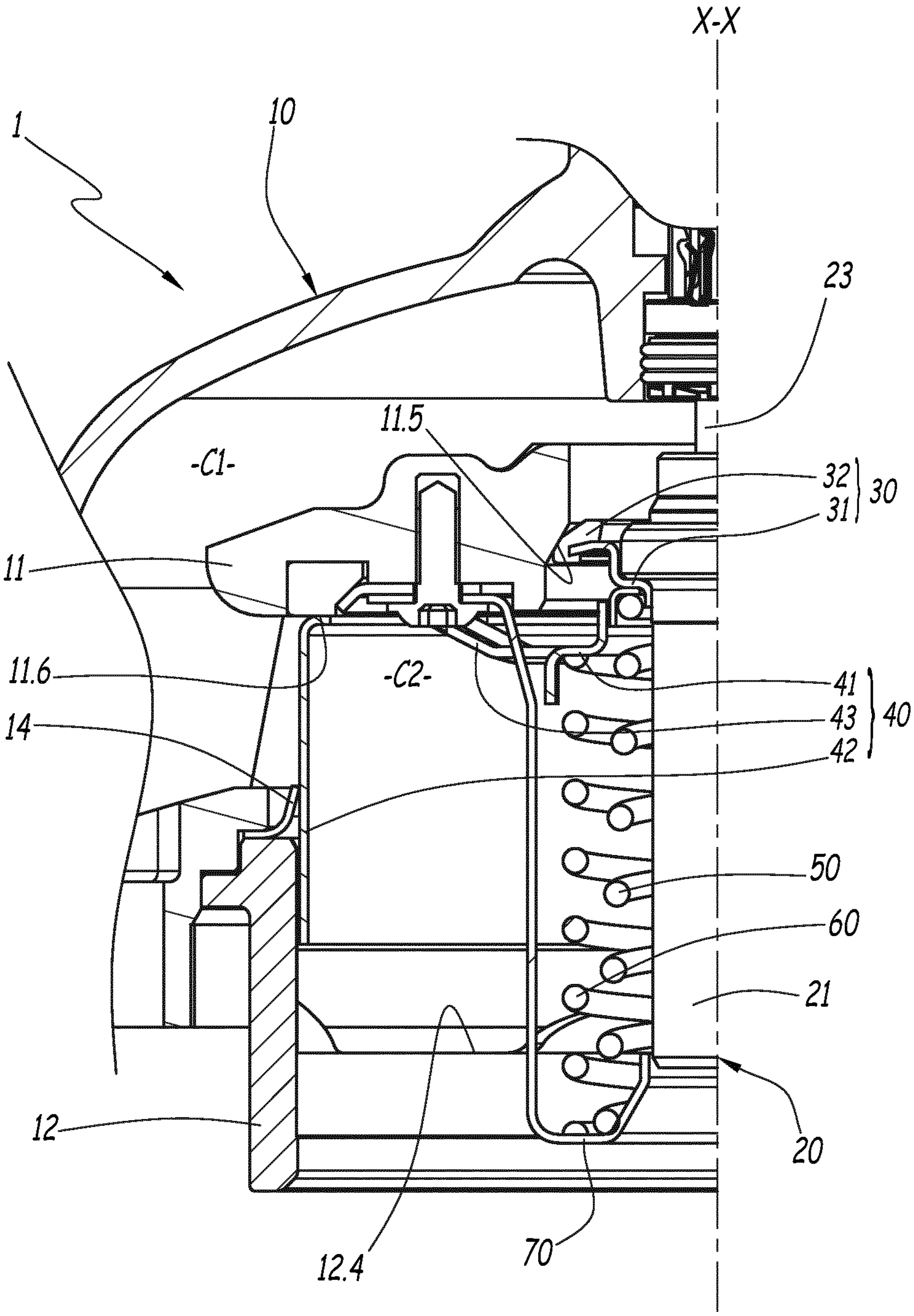
FIG. 2 is seen in elevation, along the arrow II in FIG. 1, of only part of the thermostatic valve.
Figure 3:
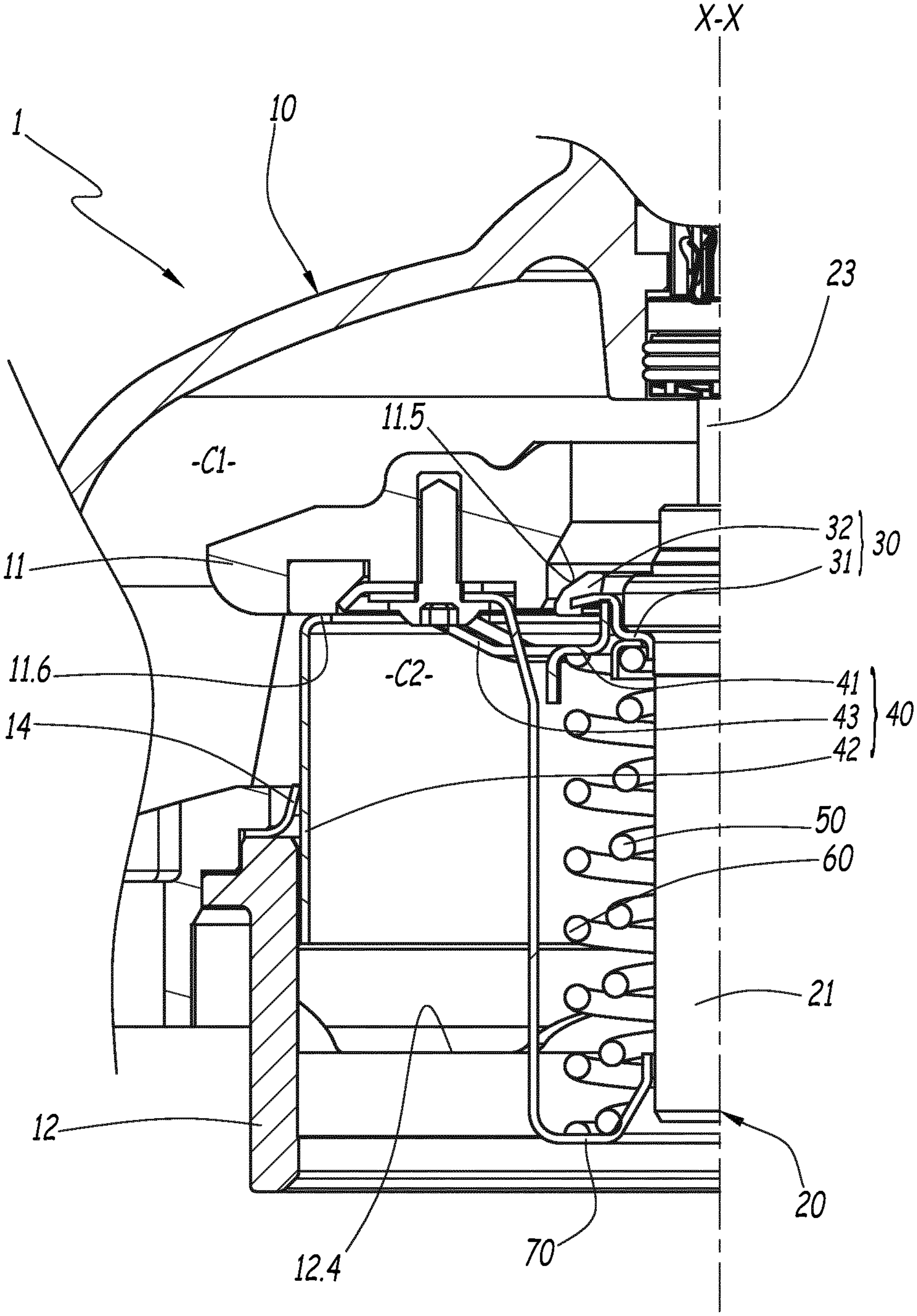
FIGS. 3 and 4 are views similar to FIG. 2, illustrating the thermostatic valve in two different respective states of operation, other than the state of operation shown in FIG. 2.

As can be seen clearly in FIGS. 1 to 3, the tubular body 12 is provided with through orifices 12.4 which connect the inner and outer faces of the tubular body 12 to each other along a direction radial to the axis X-X. The orifices 12.4 are located in a common part of the tubular body 12, i.e. a part of the latter, located axially between the axial ends 12.1 and 12.2, without the orifices 12.4 opening out onto the latter. On the inner face of the tubular body 12, the orifices 12.4 open out into the cylindrical surface 12.3. On the outer face of the main body 12, the orifices 12.4 open out to the outside of the housing 10, herein into the channel V2.

In practice, the geometrical specificities of the orifices 12.4 are not limiting. In the example envisaged in the figures, each of the orifices 12.4 has a profile which is stepped along the direction of the axis X-X, in the direction wherein the extent, along a direction peripheral to the axis X-X, of the orifices 12.4 is not constant along the axis X-X, being in particular lesser in the axial part of the orifices 12.4, oriented toward the axial end 12.2 of the tubular body 12, than in the axial part of the orifices 12.4, oriented toward the axial end 12.1. In a variant (not shown), the orifices 12.4 have profiles other than the aforementioned profile envisaged, e.g. a rectangular profile.

The cover 13 comprises a bell 13.1 which is substantially centered on the axis X-X. At the base thereof, the bell 13.1 is fastened to the seat body 11, herein at the main wall 11.2 of the latter, covering at a distance, both axially and radially, the main wall 11.1 of the seat body 11. The cover 13 further includes a tube 13.2 which connects the inside of the bell 13.1 to the outside of the housing 10. Herein, the tubing 13.2 opens out inside the bell 13.1 along a direction transverse to, or even radial to, the axis X-X; opposite the bell 13.1, the tubing 13.2 opens out into the channel V1.

Whatever the specificities of the seat body 11, the tubular body 12 and the cover 13, the components of the housing 10 jointly delimit two chambers inside the housing 10, namely a chamber C1, which is herein essentially formed by a free volume which is formed between the bell 13.1 and the seat body 11, and a chamber C2, which is herein essentially formed by, at the same time, an internal free volume of the seat body 11 and an internal free volume of the tubular body 12. In all cases, the chambers C1 and C2 can be connected directly to each other inside the housing 10 so that the fluid to be regulated by the thermostatic valve 1 can flow inside the housing 10, the connection between the chambers C1 and C2 being controlled by the plug 30 and the sleeve 40, as explained in greater detail thereafter. The plug seat 11.5 and the sleeve seat 11.6 are each located at the junction between the chambers C1 and C2. In addition, the chamber C1 can be connected directly to the outside of the housing 10, i.e. without passing through the chamber C2, in order to allow the fluid to enter the housing 10 and/or to leave the housing 10 via the chamber C1; herein, the chamber C1 can be thereby connected directly to the outside of the housing 10 via the tubing 13.2 of the cover 13, which, in the example of application defined hereinabove, allows the fluid from the channel V1 to enter the housing 10 via the chamber C1. Similarly, the chamber C2 can be connected directly to the outside of the housing 10, i.e. without passing through the chamber C1, in order to allow the fluid to enter the housing 10 and/or to leave the housing 10 via the chamber C2; herein, the chamber C2 can be thereby connected directly to the outside of the housing 10 via, on the one hand, the orifices 12.4 of the tubular body 12 and, on the other hand, the axial end 12.2 of the tubular body 12, which, in the aforementioned example of application, allows the fluid of the channel V2 to enter inside the housing 10 via the chamber C2 and also allows the fluid of the channel V3 to leave the housing via the chamber C2.

According to an advantageous optional arrangement, the housing 10 is provided with a deflector 15, herein fixedly supported by the seat body 11. The deflector 15 protrudes axially from the face of the main wall 11.1, turned axially opposite the main wall 11.2, and runs over only part of the inner periphery of the main wall 11.1, namely the part furthest from the tubing 13.2, as clearly visible in FIG. 1. The deflector 15 thereby surrounds the outlet of the plug seat 11.5 into the chamber C1, only over a peripheral portion of the outlet, namely the portion furthest from the tube 13.2, so as to break fluid flows grazing the plug seat 11.5 transversely to the axis X-X.

The thermostatic element 20 will now be described in more detail. In the assembled state of the thermostatic valve 1, the thermostatic element 20 is centered on the axis X-X. The thermostatic element 20 includes a body 21, which is substantially centered on the axis X-X and which contains a thermally expandable material 22, such as a wax. Herein, the body 21 is essentially arranged in the chamber C2. The thermostatic element 20 further comprises a piston 23, the central longitudinal geometric axis of which is aligned with the axis X-X and a terminal axial part of which is received in the body 21, being immersed therein in the thermally expandable material 22. The body 21 and the piston 23 are movable relative to each other in translation along the axis X-X, so that, under the effect of expansion of the thermally expandable material 22, the piston 23 moves away from the body 21 by deploying outside the latter, whereas, during a contraction of the thermally expandable material 22, the piston 23 is retractable inside the body 21.

In the assembled state of the thermostatic valve 1, the piston 23 is fixedly connected to the housing 10 by any appropriate means. More precisely, the terminal part of the piston 23, opposite that immersed in the body 21, is fixedly connected to a region of the housing 10, arranged across the axis X-X, the region herein belonging to the cover 13, in particular the top part of the bell 13.1 of the latter. Herein, the piston 23 thereby extends from the cover 13 of the housing 10, both into the chamber C1 and into the chamber C2. In practice, various embodiments can be envisaged with regard to the fixed means of connection between the aforementioned terminal part of the piston 23 and the housing 10, herein the cover 13 of the latter: the fixed means of connection can be either an axial bearing means, or a removable fastening means, such as a means of clipping or a means of sliding fitting, or a permanent means of rigid attachment, such as a means of force fitting, a means of overmolding or a mechanical holding system. In all cases, it is understood that, when the thermally expandable material 22 contained in the body 21 expands or contracts, the piston 23 is held immobile with respect to the housing 10.

In the embodiment considered in FIGS. 1 to 4, the thermostatic element 20 incorporates an electric heating resistor 24 which is arranged inside the piston 23 so as to heat the thermally expandable material 22. To this end, the piston 23 is made, at least as far as the terminal part thereof immersed in the body 21 is concerned, of a thermally conductive material, typically metal. In practice, various embodiments can be envisaged as regards the electric heating resistor 24, the resistor being symbolized, in FIG. 1, by a zigzag line, without the schematic representation being limiting. In all cases, the electric heating resistor 24 is supplied with electricity from outside the housing 10 by a source of current external to the thermostatic valve 1, the electric heating resistor 24 being connected to the latter by electrical conductors 25. Again, the embodiment of electrical conductors 25 is not limiting. Whatever the embodiment thereof, the electrical conductors 25 extend, from the electrical heating resistor 24, to the outside of the housing 10, passing through the fixed means of connection between the piston 23 and the housing 10 and passing through, in a leak-tight manner, a wall of the housing 10, herein the wall of the bell 13.1 of the cover 13, until same join a connection base 16, with which the housing 10 is provided externally, herein the cover 13 of the latter, and which serves to connect the aforementioned source of current.

Figure 4:
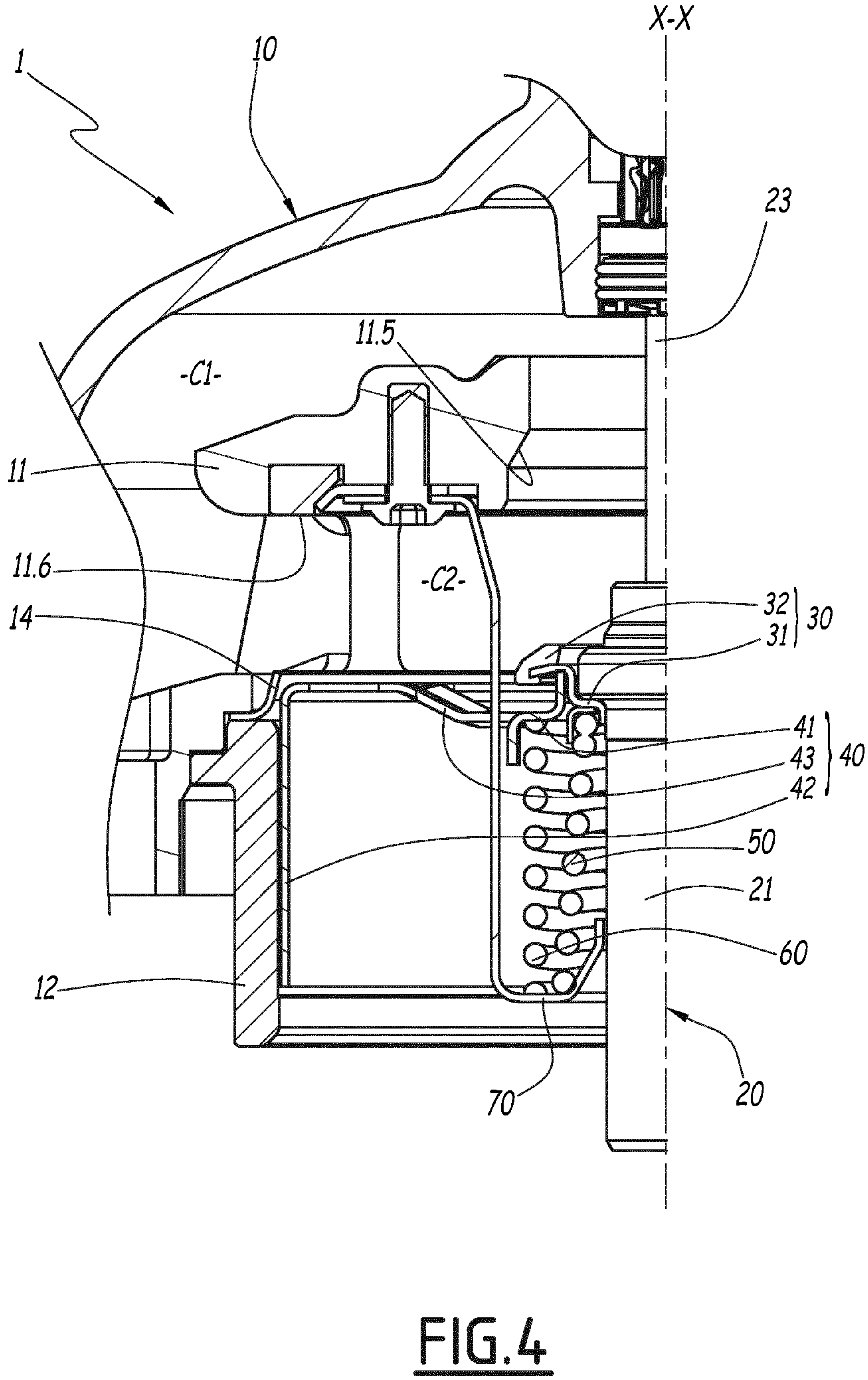

The plug 30 will now be described in more detail. The plug 30 is centered on the axis X-X and is movable along the axis X-X with respect to the housing 10 so as to control a flow of fluid between the chamber C1 and the chamber C2. More precisely, the plug 30 is axially movable relative to the plug seat 11.5, thereby being movable between:

- a closed configuration, which is shown in FIGS. 1 and 2 and wherein the plug 30 is pressed axially against the plug seat 11.5 so as to prevent the fluid from passing through the seat 11.5 to circulate between the chambers C1 and C2;
- an open configuration, which is shown in FIGS. 3 and 4 and wherein the plug 30 is moved away from the plug seat 11.5 so as to allow the fluid to flow between chambers C1 and C2 by passing through the seat 11.5.

In the embodiment considered in FIGS. 1 to 4, the plug 30 in the open configuration is situated, along the axis X-X, substantially at the same level as the main wall 11.1 of the seat body 11, being received herein in the inner periphery of the main wall 11.1; the plug 30 in the open configuration is arranged in the chamber C2.

In the example of application defined hereinabove, the plug 30 allows at least a portion of the fluid entering the chamber C1 from the channel V1 to pass through the plug seat 11.5, when the plug 30 is in the open configuration. When the plug 30 is in the closed configuration, the plug prevents the fluid entering the chamber C1 from the channel V1 from reaching the chamber C2.

To control the displacement of the plug 30, the latter is connected to the body 21 of the thermostatic element 20 so that the axial displacement of the body 21 relative to the housing 10, resulting from the expansion of the thermally expandable material 22, causes a corresponding displacement of the plug 30 so as to change the latter from the closed configuration to the open configuration. Thereby, during the expansion of the thermally expandable material 22, the body 21 of the thermostatic element 20 drives the plug 30 along the axis X-X with respect to the housing 10 from the closed configuration to the open configuration, more particularly from a closed position of FIGS. 1 and 2, which is occupied by the plug 30 in the closed configuration, to an open position of FIG. 4 where the plug 30 is in the open configuration, passing through a predetermined intermediate position of FIG. 3 where the plug 30 is also in the open configuration, it being noted that further information about the intermediate position 3 will be given thereafter.

According to a practical embodiment, which is implemented in the embodiment considered herein, the plug 30 is fixedly connected to the body 21 of the thermostatic element 20.

In the example of embodiment illustrated in FIGS. 1 to 4, the plug 30 comprises, in the central region with respect to the axis X-X, a armature 31 which is provided so as to be rigid, being typically made of metal. In the example illustrated in the figures, the armature 31 is similar to a ring, without however the embodiment being limiting. The plug 30 also comprises, but in the peripheral region with respect to the axis X-X, a sealing lining 32 which is provided flexible compared to the armature 31, being made e.g. of polymer or rubber. The sealing lining 32 is arranged on the outer periphery of the armature 31, i.e. the periphery of the latter, oriented radially opposite from the axis X-X. The sealing lining 32 is e.g. overmolded on the central armature 31. The sealing lining 32 forms the part of the plug 30 which cooperates by bearing axially on the plug seat 11.5 in order to control the flow of fluid between the chambers C1 and C2 by passing through the plug seat 11.5, whereas the armature 31 forms the part of the plug 30 which cooperates with the body 21 of the thermostatic element 20 for the purpose of connecting the plug to the body 21. Thereby, the armature 31 is e.g. fitted tightly around the body 21 of the thermostatic element 20, by fixedly connecting the plug 30 to the body 21.

The sleeve 40 will now be described in more detail. The sleeve 40 is centered on the axis X-X and is movable along the axis with respect to the housing 10 so as to control both a flow of fluid between the chamber C1 and the chamber C2, which is different from the flow of fluid controlled by the plug 30, and a flow of fluid between the chamber C2 and the outside of the housing 10 via the orifices 12.4 of the housing 10.

More precisely, the sleeve 40 is axially movable relative to the seat of the sleeve 11.6, thus being movable between:

- a first configuration, which is shown in FIGS. 1, 2 and 3 and wherein the sleeve 40 is pressed axially against the sleeve seat 11.6 so as to prevent the fluid from passing through the seat 11.6 to circulate between the chambers C1 and C2, and
- a second configuration, which is shown in FIG. 4 and wherein sleeve 40 is spaced from the sleeve seat 11.6 so as to allow fluid to flow between chambers C1 and C2 by passing through sleeve seat 11.6.

In addition, the sleeve 40 is received coaxially, mating inside the tubular body 12 of the housing 10 and is movable there along the axis X-X between the first and second configurations so that:

- in the first configuration, the sleeve 40 leaves the orifices 12.4 uncovered so as to allow the fluid to flow radially to the axis X-X between the chamber C2 and the outside of the housing 10 via the orifices 12.4, and
- in the second configuration, the sleeve 40 covers, along a direction substantially radial to the axis X-X, the orifices 12.4 so as to prevent the fluid from flowing radially to the axis X-X between the chamber C2 and the outside of the housing 10 via the orifices 12.4.

In the embodiment considered in FIGS. 1 to 4, the sleeve 40 is arranged in the chamber C2, more particularly at the junction between the latter and the chamber C1 when the sleeve 40 is in the first configuration. In addition, the sealing lip 14 surrounds the sleeve 40 externally, being applied against the outer face of the latter, to prevent the fluid from circulating through the outside of the sleeve 40 between the chambers C1 and C2 whatever the position of the sleeve along the axis X-X between the first and second configurations.

In the example of application defined hereinabove, when the sleeve 40 is in the second configuration, the sleeve 40 allows a part of the fluid entering the chamber C1 from the channel V1 to pass into the chamber C2, in addition to the part of the fluid, which the plug 30 allows to pass into the chamber C2 in the open configuration, whereas, at the same time, the sleeve 40 prevents the fluid from the channel V2 from entering radially to the axis X-X into the chamber C2 via the orifices 12.4. When the sleeve 40 is in the first configuration, the sleeve 40 prevents the fluid entering the chamber C1 from the channel V1 from reaching the chamber C2 by passing through the sleeve seat 11.6, whereas, at the same time, the sleeve 40 allows the fluid from the channel V2 to enter the chamber C2 radially to the axis X-X, via the orifices 12.4.

To control the displacement of the sleeve 40, the latter is connected to the plug 30 so that the axial displacement of the plug 30 with respect to the housing 10, resulting from the expansion of the thermally expandable material 22, leads to (i) a corresponding displacement of the sleeve 40 in the first configuration thereof with respect to the housing 10 as long as the plug 30 is between the closed position of FIG. 1, corresponding to the closed configuration thereof, and the aforementioned intermediate position of FIG. 3, then to (ii) a corresponding displacement of the sleeve 40 so as to change the latter from the first configuration thereof to the second configuration when the plug 30 in the open configuration is driven by the thermostatic element 20 from the aforementioned intermediate position to the open position of the latter illustrated in FIG. 4. Thereby, the sleeve 40 and the plug 30 are connected to each other in such a way that during the expansion of the thermally expandable material 22:

- the sleeve 40 is immobile with respect to the housing 10, remaining in the first configuration thereof, while the body 21 of the thermostatic element 20 drives the plug from the closed configuration thereof to the open configuration thereof, until the plug 30 occupies the aforementioned intermediate position of FIG. 3, then
- when the plug 30 in the open configuration is driven along the axis X-X with respect to the housing 10 by the body 21 of the thermostatic element 20 beyond the aforementioned intermediate position, the plug 30 drives the sleeve 40 along the axis X-X with respect to the housing 10 from the first to the second configuration of the sleeve.

According to a practical embodiment, which is implemented in the embodiment considered in FIGS. 1 to 4, the sleeve 40 is assembled to the plug 30:

- freely sliding along the axis X-X when the plug 30 is driven between the closed configuration thereof and the aforementioned intermediate position thereof shown in FIG. 3, and
- fixedly along the axis X-X when the plug 30 in the open configuration is driven beyond the aforementioned intermediate position thereof.

In the example of embodiment considered in FIGS. 1 to 4, the sleeve 40 comprises, in the central region with respect to the axis X-X, an armature 41 which is provided as rigid, being typically made of metal. The sleeve 40 further includes, but in the peripheral region with respect to the axis X-X, a cylindrical skirt 42 which is centered on the axis X-X and which is connected to the armature 41, e.g. being made integral with the latter, by arms 43 of the sleeve 40, which extend transversely to the axis X-X. The cylindrical skirt 42 forms the part of the sleeve 40, which cooperates with the housing 10 in order to control the flows of fluid mentioned hereinabove: more precisely, one of the two axial ends of the cylindrical skirt 42 cooperates by axial bearing with the sleeve seat 11.6 so as control the flow of fluid between the chambers C1 and C2 by passing through the sleeve seat 11.6 whereas a current part of the cylindrical skirt 42 cooperates by radially covering the orifices 12.4 in order to control the flow of fluid radially to the axis X-X between the chamber C2 and the outside of the housing 10 via the orifices 12.4. The armature 41 forms the part of the sleeve 40 which cooperates with the plug 30 for the purpose of the mechanical connection between the plug 30 and the sleeve 40. Herein, the armature 41 is mounted around the armature 30 of the plug 30 so as to:

- leave the armatures 31 and 41 freely sliding along the axis X-X with respect to each other when the plug 30 is driven between the closed configuration thereof and the aforementioned intermediate position thereof, and
- fixedly connect the armatures 31 and 41 to each other along the axis X-X by bearing axially when the plug 30 in the open configuration is driven beyond the aforementioned intermediate position thereof.

In order to drive the plug 30 and the sleeve 40 when the thermally expandable material 22 contracts after having been expanded, the thermostatic valve 1 includes two return springs 50 and 60 which are associated with the plug 30 and with the sleeve 40, respectively, and which, within the thermostatic valve 1, are provided compressed along the axis X-X. The return spring 50 is functionally interposed between the housing 10 and the plug 30 so as to drive the plug from the open configuration to the closed configuration during a contraction of the thermally expandable material 22. Similarly, the return spring 60 is functionally interposed between the housing 10 and the sleeve 40 so as to drive the sleeve 40 from the second configuration to the first configuration during the contraction of the thermally expandable material. Structurally, the interposition of the spring 50 between the housing 10 and the plug 30 may be direct or indirect. Similarly, the interposition of the return spring 60 between the housing 10 and the sleeve 40 may be direct or indirect.

To this end, in the embodiment considered in FIGS. 1 to 4, the thermostatic valve 1 includes only one and same support bracket 70 which is dedicated to transmitting to the housing 10 the forces generated by the return springs 50 and 60. The support bracket 70, which forms a distinct part of the housing 10, is rigidly attached to the housing 10, herein to the seat body 11, more particularly to the main wall 11.1 thereof. The support bracket 70 extends substantially parallel to the axis X-X from the housing 10, more particularly the main wall 11.1 of the seat body 11 thereof, inside the sleeve 40, as far as an axial end of the support bracket 70, against which respective end turns of the return springs 50 and 60 bear axially. The respective end turns of the return springs 50 and 60, opposite the turn bearing against the support bracket 70, are herein pressed directly against the plug 60 and the sleeve 40, respectively, more particularly the armature 31 of the plug 30 and the armature 41 of the sleeve 40.

The operation of the thermostatic valve 1 will now be described with reference to FIGS. 2 to 4, in the context of the example of application of the thermostatic valve, mentioned hereinabove.

In the state of operation shown in FIG. 2, the fluid entering the chamber C1 via the channel V1 is prevented from passing through the plug seat 11.5 by the plug 30 in the closed configuration and is prevented from passing through the sleeve seat 11.6 by the sleeve 40 in the first configuration: the fluid thus does not reach the chamber C2 from the chamber C1. At the same time, the fluid feeding the orifices 12.4 from outside the housing 10 via the channel V2 enters radially to the axis X-X into the chamber C2 via the orifices 12.4 which are left uncovered by the sleeve 40 in the first configuration. From the chamber C2, the fluid leaves the housing 10 via the axial end 12.2 of the tubular body 12, thereby flowing into the channel V3.

When the thermally expandable material 22 expands, the thermostatic valve 1 changes from the state of operation shown in FIG. 2 to the state of operation shown in FIG. 3 and then, if the expansion of the expandable material 22 continues, to the state of operation shown in FIG. 4. The expansion of the thermally expandable material 2 results from an increase in the temperature of the fluid in the chamber C2 and/or from an activation of the electric heating resistor 24.

During the expansion of the thermally expandable material 22 causing the thermostatic valve 1 to change from the state of operation shown in FIG. 2 to the state of operation shown in FIG. 3, the body 21 of the thermostatic element 20 moves axially away from the piston 23 held fixedly with respect to the housing 10. The body 21 of the thermostatic element 20 drives the plug 30 in a corresponding manner along the axis X-X with respect to the housing 10, thereby making the plug 30 change from the closed configuration to the open configuration, until the plug 30 occupies the intermediate position shown in FIG. 3. The deflector 15 advantageously serves to break the flows of fluid grazing the plug seat 11.5 transversely to the axis X-X, in order to limit cavitation or Venturi effect phenomena. At the same time, the sleeve 40 remains in the first configuration thereof since the sleeve 40 is not driven by the plug 30, which in particular slides freely along the axis X-X with respect to the sleeve 40, so that the sleeve 40 remains immobile with respect to the housing 10. As a result, the fluid entering the chamber C1 via the channel V1 continues to be prevented from passing through the sleeve seat 11.6 by the sleeve 40, but is allowed by the plug 30 to pass through the plug seat 11.5 and thus reach the chamber C2. At the same time, the fluid feeding the orifices 12.4 from outside the housing 10 via the channel V2 continues to enter the chamber C2 via the orifices 12.4 thereof. From the chamber C2, the fluid continues to leave the housing 10 by joining the channel V3. The return spring 50 is crushed, but not the return spring 60.

During the expansion of the thermally expandable material 22 making the thermostatic valve change from the state of operation shown in FIG. 3 to the state of operation shown in FIG. 4, the body 21 of the thermostatic element 20 drives the plug 30 in the open configuration along the axis X-X with respect to the housing 10 beyond the intermediate position shown in FIG. 3. As a result, the plug 30 then drives the sleeve 40 in a corresponding manner along the axis X-X with respect to the housing 10 from the first to the second configuration of the sleeve, in particular by axial bearing of the armature 31 against the armature 41. The fluid entering the chamber C1 from the channel V1 is no longer prevented from passing through the sleeve seat 11.6 by the sleeve 40: on the contrary, the fluid passes from the chamber C1 to the chamber C2 by passing through the sleeve seat 11.6, while continuing to pass through the plug seat 11.5 because of the open configuration of the plug 30. At the same time, the fluid feeding the orifices 12.4 from outside the housing 10 via the channel V2 is prevented from entering the chamber C2 radially to the axis X-X by the sleeve 40 which covers the orifices 12.4, radially on the axis X-X. Thereby, unlike the state of operation shown in FIG. 3, wherein the fluid in chamber C2 results from the mixing of the fluids originating respectively from channels V1 and V2, the fluid present in chamber C2 in the state of operation shown in FIG. 4 consists exclusively of the fluid originating from channel V1, except for leaks. The return springs 50 and 60 are crushed.

Taking into account the foregoing explanations, it should be understood that the intake into chamber C2 of the fluid from chamber C1 is progressive during the expansion of the thermally expandable material 22, in the sense that, initially, i.e. during the change from the state of operation shown in FIG. 2 to the state of operation shown in FIG. 3, the quantity of fluid reaching chamber C2 from chamber C1 is not zero, but limited because of the reduced flow section between the plug seat 11.5 and the plug 30 in the open configuration, the flow cross-section being more particularly considerably smaller that same between the sleeve seat 11.6 and the sleeve 40 in the second configuration of the latter. Secondly, i.e. during the change from the state of operation shown in FIG. 3 to the state of operation shown in FIG. 4, the fluid flows from chamber C1 to chamber C2 in a much greater quantity, because of the substantial flow cross-section between the sleeve seat 11.6 and the sleeve 40 in the second configuration of the latter. There are many advantages of such a progressive intake of the fluid from the chamber C1 into the chamber C2, in particular in connection with the regulation effected by the thermostatic element 20: thereof prevents the thermostatic element 20 from being suddenly subject to sudden changes in the temperature of the fluid wherein the body 21 thereof is immersed; as a result, moreover, the fluid passing through the plug seat 11.5 can flow rather along the body 21 of the thermostatic element, which thermally sensitizes the latter in an effective way. It should also be understood that the progressivity of the intake of the fluid from the chamber C1 into the chamber C2 can be adapted by varying the respective sizes of the passage cross-sections associated with the plug seat 11.5 and with the sleeve seat 11.6, respectively, in particular by varying the respective diameters of the plug seat 11.5 and of the sleeve seat 11.6. It is also possible to vary the axial travel of the plug 30 in order to change from the closed configuration thereof to the intermediate position of the open configuration thereof, as well as on the throttling characteristics between the plug seat 11.5 and the plug 30, in particular in connection with the structural and geometrical specificities of the plug seat 11.5 and/or of the plug 30.

When the temperature to which the thermostatic element 20 is subjected then decreases, the thermally expandable material 22 contracts and, under the effect of decompression of the return springs 50 and 60, the sleeve 40 changes from the second configuration thereof to the first configuration thereof, progressively uncovering the orifices 12.4, while progressively approaching the sleeve seat 11.6, whereas the plug 30 remains in the open configuration, while progressively approaching the plug seat 11.5, until returning to the aforementioned intermediate position where the sleeve 40 reaches the first configuration thereof. When the thermally expandable material 22 continues to shrink, the sleeve 40 remains immobile in the first configuration thereof, whereas, under the effect of decompression of the return spring 50, the plug 30 changes from the open configuration thereof, more precisely from the aforementioned intermediate position thereof, to the closed configuration thereof.

Figure 5:
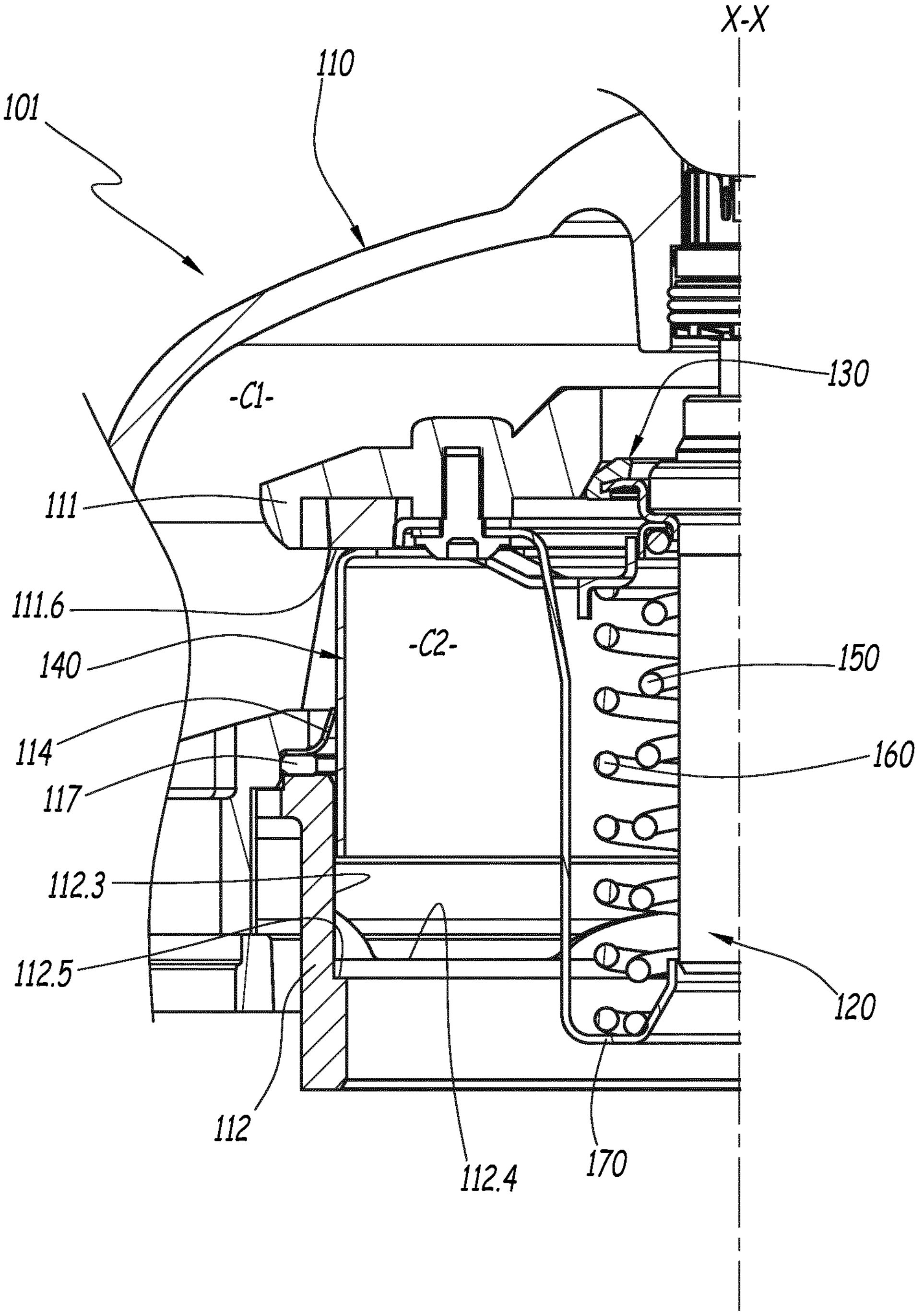
FIGS. 5 and 6 are views similar to FIGS. 2 and 4, respectively, illustrating a second embodiment of a thermostatic valve according to the invention.
Figure 6:
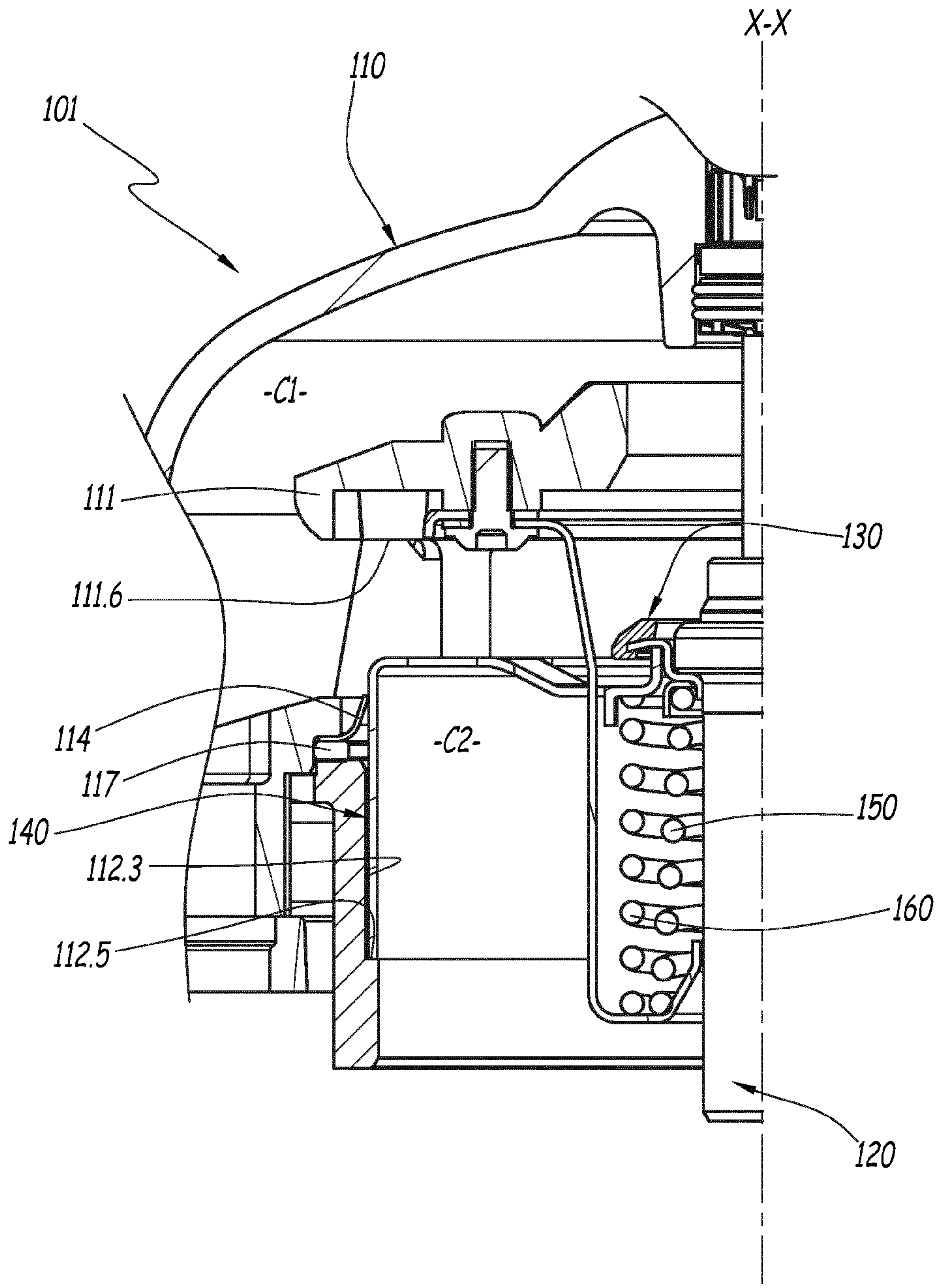

FIGS. 5 and 6 show an embodiment alternative to the valve 1, in the form of a thermostatic valve 101.

The thermostatic valve 101 is functionally similar to the thermostatic valve 1 in the sense that the thermostatic valve 101 comprises a housing 110, a thermostatic element 120, a plug 130, a sleeve 140, return springs 150 and 160, and a support bracket 170, which are functionally or even structurally similar to the housing 10, the thermostatic element 20, the plug 30, the sleeve 40, the return springs 50 and 60, and to the support bracket 70, respectively, of the thermostatic valve 1. The housing 110 comprises in particular a seat body 111 and a tubular body 112, which are similar to the seat body 11 and to the tubular body 12, respectively. As can be seen clearly in FIG. 5, the tubular body 112 is provided with orifices 112.4, which are similar to the orifices 12.4 and which, on the inner face of the tubular body 112, open out onto a cylindrical surface 112.3 similar to the cylindrical surface 12.3. The sleeve 140 includes a cylindrical skirt 142 similar to the cylindrical skirt 42.

This being the case, the thermostatic valve 101 differs from the thermostatic valve 1 by the fact that, unlike the thermostatic valve 1, the thermostatic valve 101 does not provide that its sleeve 140 does not interfere axially with its housing 110, whatever the position of the sleeve 140 in its second configuration along the axis X-X. To this end, in addition to the sleeve seat 111.6, which is similar to the sleeve seat 11.6 and which is here borne by the seat body 111, the housing 110 fixedly carries a sleeve seat 112.5 which is advantageously carried by the tubular body 112. The sleeve seat 112.5 is substantially aligned, along the direction of the axis X-X, with the sleeve seat 111.6. When the sleeve 140 is in the first configuration, as in FIG. 1, the sleeve 140 is moved away from the sleeve seat 112.5. On the other hand, during the expansion of the thermally expandable material of the thermostatic element 120, the sleeve 140 in the second configuration is driven along the axis X-X with respect to the housing 110 by the plug 130 until same is pressed axially against the sleeve seat 112.5 so as to prevent the fluid from flowing between the chamber C2 and the orifices 112.4 by passing through the sleeve seat 112.5, as illustrated in FIG. 6.

Thereby, when the sleeve 140 is in the second configuration thereof, as in FIG. 6, the axial bearing of the sleeve 140 against the sleeve seat 112.5 substantially limits the setting in fluid communication between the chamber C2 and the cylindrical interface between the outer face of the cylindrical skirt 142 of the sleeve 140 and the cylindrical surface 112.3 of the inner face of the tubular body 112. In this way, within the framework of the example of application defined hereinabove, the fluid feeding the orifices 112.4 from outside the housing 110 via the channel V2 is prevented, when the sleeve 140 is in the second configuration thereof, from flowing via the aforementioned cylindrical interface to the interior of the chamber C2, by being stopped at the sleeve seat 112.5 against which the sleeve 140 is pressed axially.

In practice, the presence of the sleeve seat 112.5 makes the assembly of the thermostatic valve 101 a little more complex than the assembly of the thermostatic valve 1. More particularly, provision may be made for the tubular body 112 to be directly mounted and fastened to the rest of the housing 110 only after the sleeve 140 has been fitted within the thermostatic valve 101. The thermostatic valve 101 then advantageously comprises an assembly ring 117 which, even before the tubular body 112 is fitted, clamps against the seat body 111, a sealing lip 114 similar to the sealing lip 14 and which, in the assembled state of the thermostatic valve 101, is kept in place by the tubular body 112.

Figure 7:
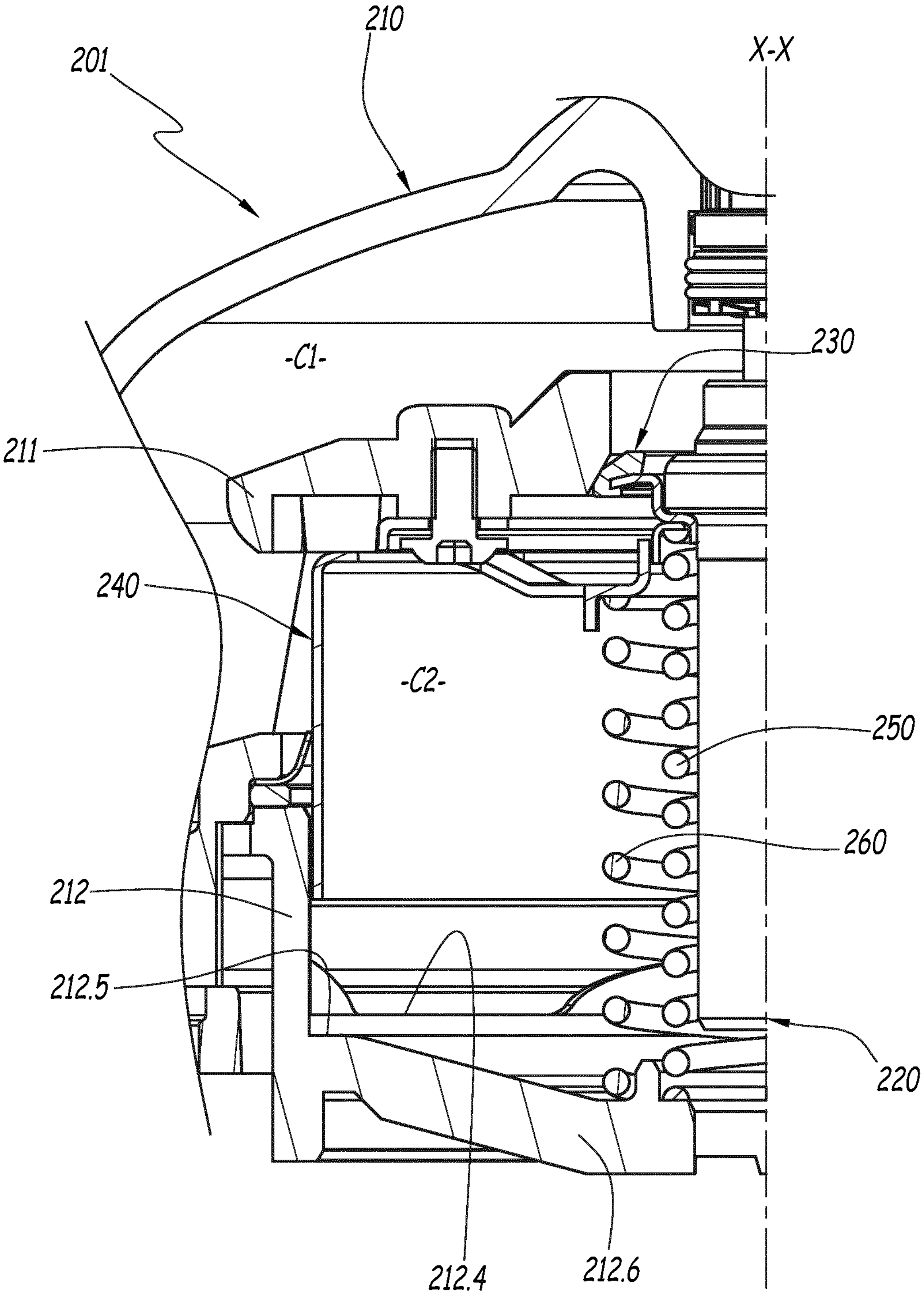
FIG. 7 is a view similar to FIG. 2, illustrating a third embodiment of a thermostatic valve according to the invention.

FIG. 7 shows an embodiment alternative to the thermostatic valves 1 and 101 in the form of a thermostatic valve 201. The thermostatic valve 201 is functionally similar to the thermostatic valve 101, in the sense that the thermostatic valve 201 includes a housing 210, a thermostatic element 220, a plug 230, a sleeve 240 and return springs 250 and 260, which are functionally or even structurally similar to the housing 110, the thermostatic element 120, the plug 130, the sleeve 140, and to the return springs 150 and 160, respectively. More particularly, the housing 210 includes a seat body 211 and a tubular body 212, which are similar to the seat body 111 and to the tubular body 112, respectively. The tubular body 112 is provided with orifices 212.4 and a sleeve seat 212.5, which are similar to the orifices 112.4 and to the sleeve seat 112.5, respectively.

Given the above, the thermostatic valve 201 differs from the thermostatic valve 101 by the fact that same does not have a support bracket similar to the support bracket 170. The return springs 260 and 250 thus do not bear against such a support bracket, but against a support part 212.6 which is integrated into the housing 210, more particularly into the tubular body 212. The support part 212.6 extends transversely to the axis X-X, forming an axial support for the return springs 250 and 260, and is arranged entirely outside the sleeve 240, being situated in particular on the axial side of the sleeve seat 212.5, oriented opposite to the seat body 211. In practice, the support part 212.6 is advantageously made integral with the rest of the tubular body 212, which proves to be particularly practical and economical.

FIGS. 8 to 12 show an embodiment alternative to the thermostatic valves 1, 101 and 201, in the form of a thermostatic valve 301.

The thermostatic valve 301 is functionally similar to the thermostatic valve 201, in the sense that the thermostatic valve 301 includes a housing 310, a thermostatic element 320, a plug 330, a sleeve 340, and return springs 350 and 360, which are functionally or structurally similar to the housing 210, the thermostatic element 220, the plug 230, the sleeve 240, and to the return springs 250 and 260, respectively. More particularly, the housing 310 includes a seat body 311 and a tubular body 312, which are similar to the seat body 211 and to the tubular body 212, respectively. The tubular body 312 is provided with orifices 312.4, a sleeve seat 312.5 and a support part 312.6, which are similar to the orifices 212.4, the sleeve seat 212.5 and the support part 212.6, respectively. The thermostatic element 320 includes a body 321 and a piston 323, which are similar to the body 21 and to the piston 23 of the thermostatic element 20, respectively.

Figure 8:
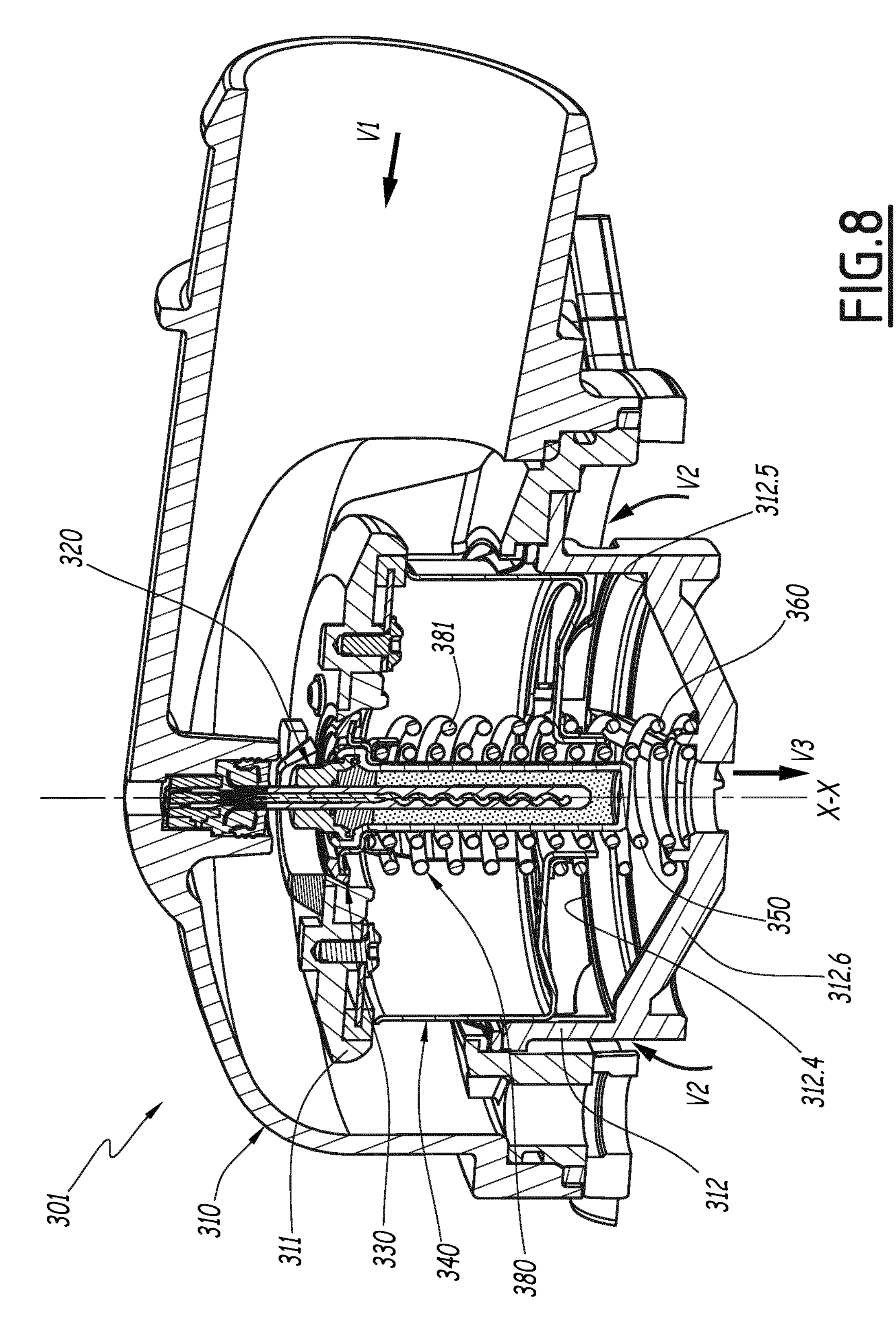
FIG. 8 is a view similar to FIG. 1, illustrating a fourth embodiment of a thermostatic valve according to the invention.
Figure 9:
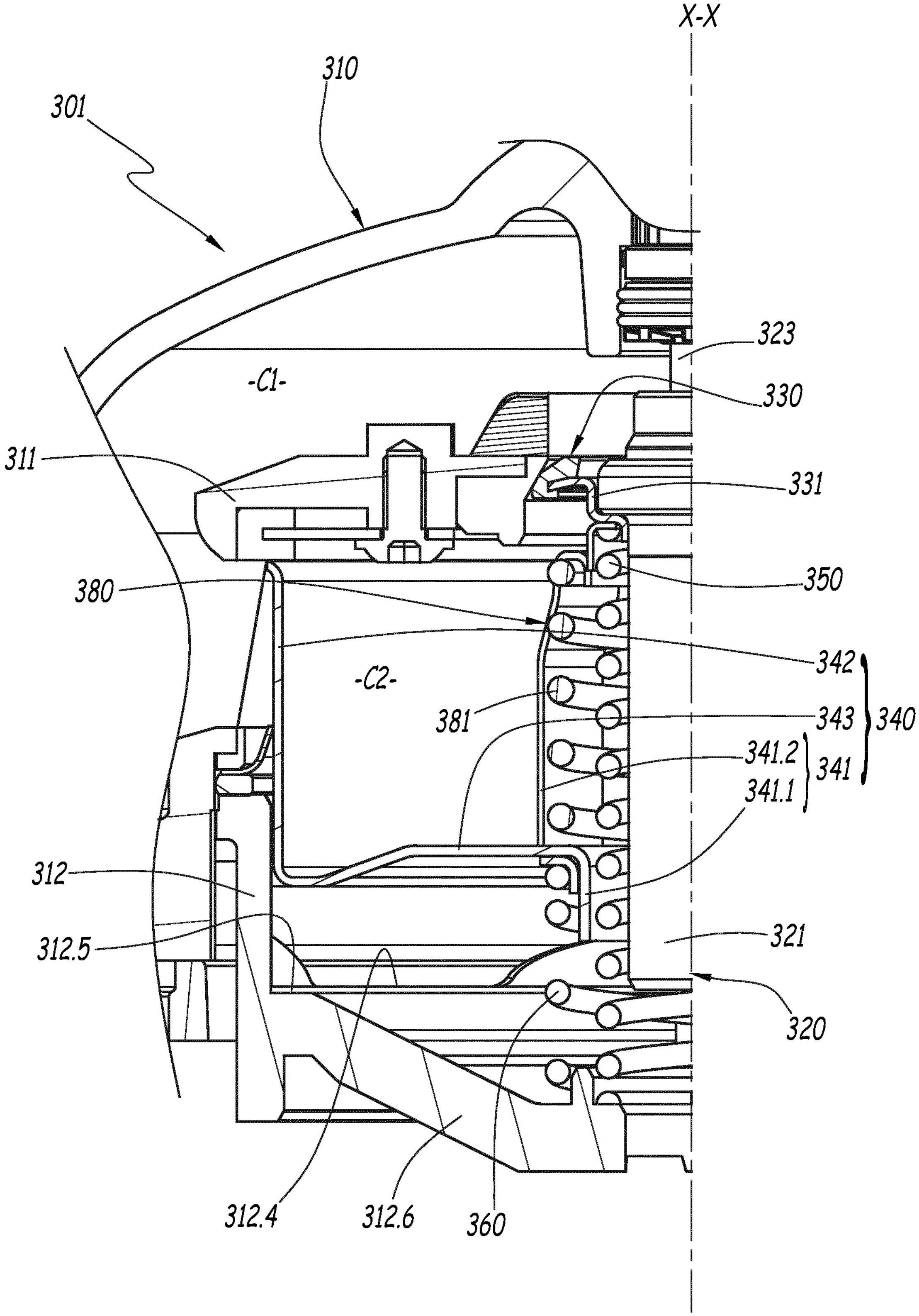
FIGS. 9 to 11 are views similar to FIGS. 2 to 4, respectively for the fourth embodiment.
Figure 10:
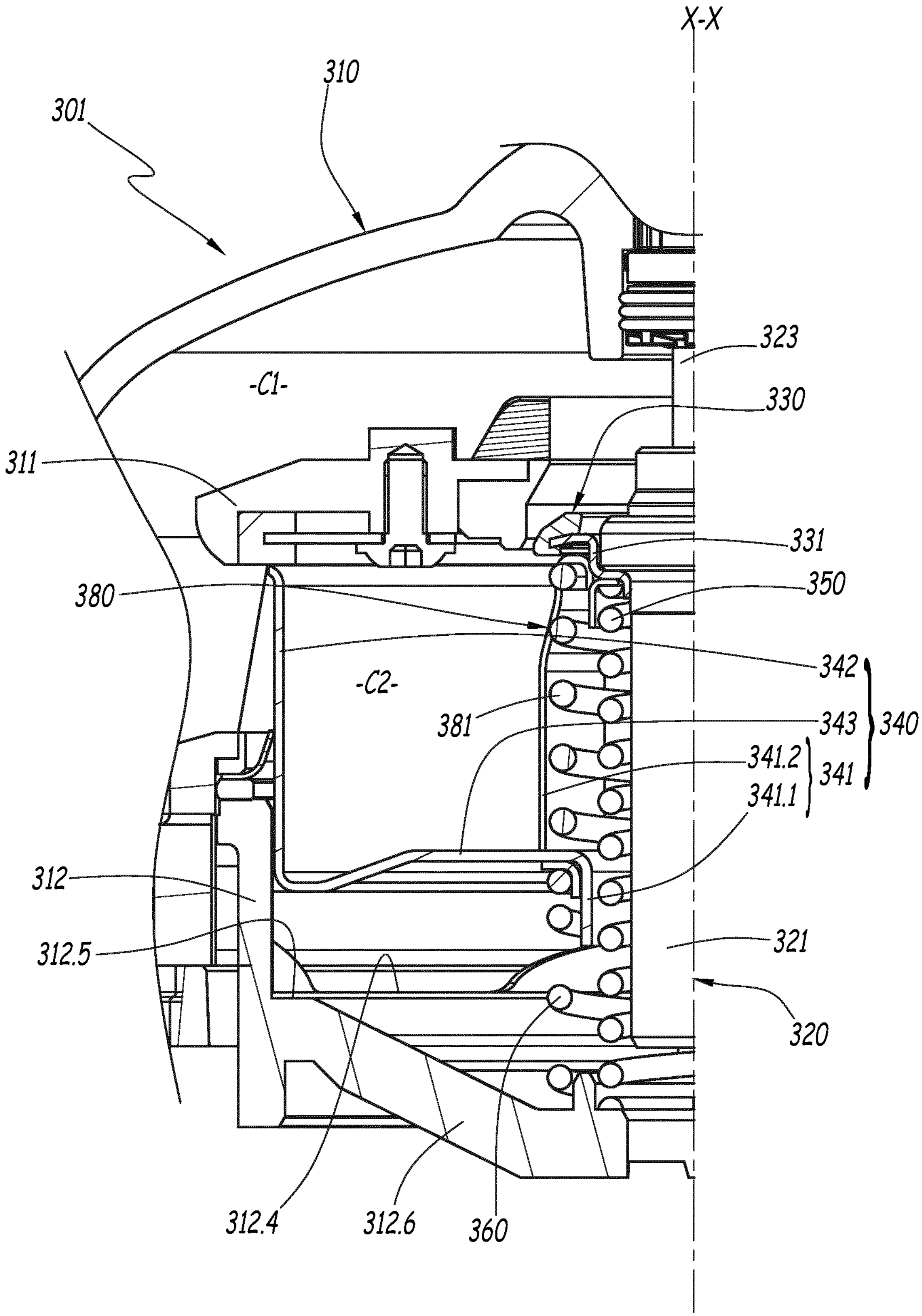
Figure 11:
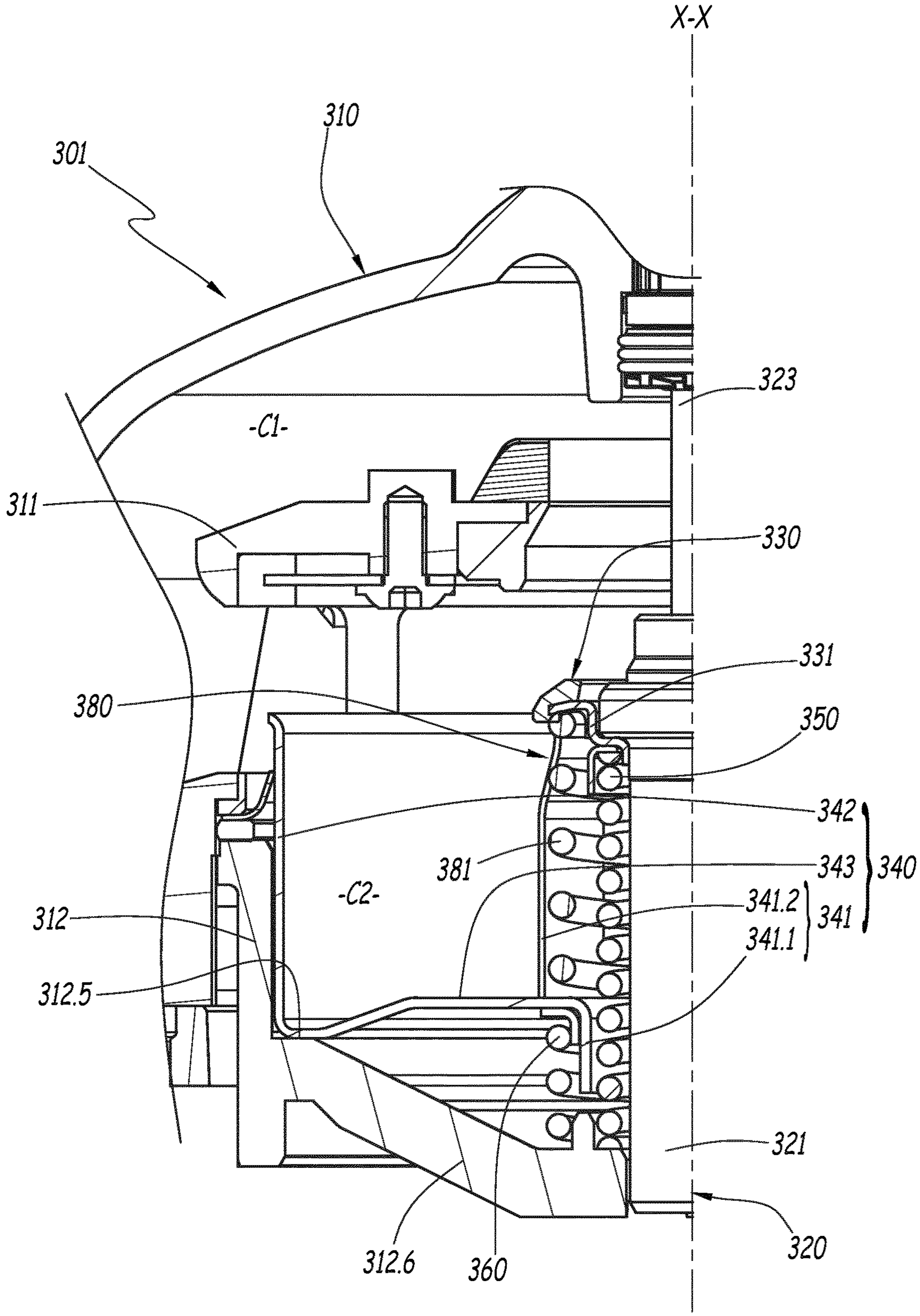
Figure 12:
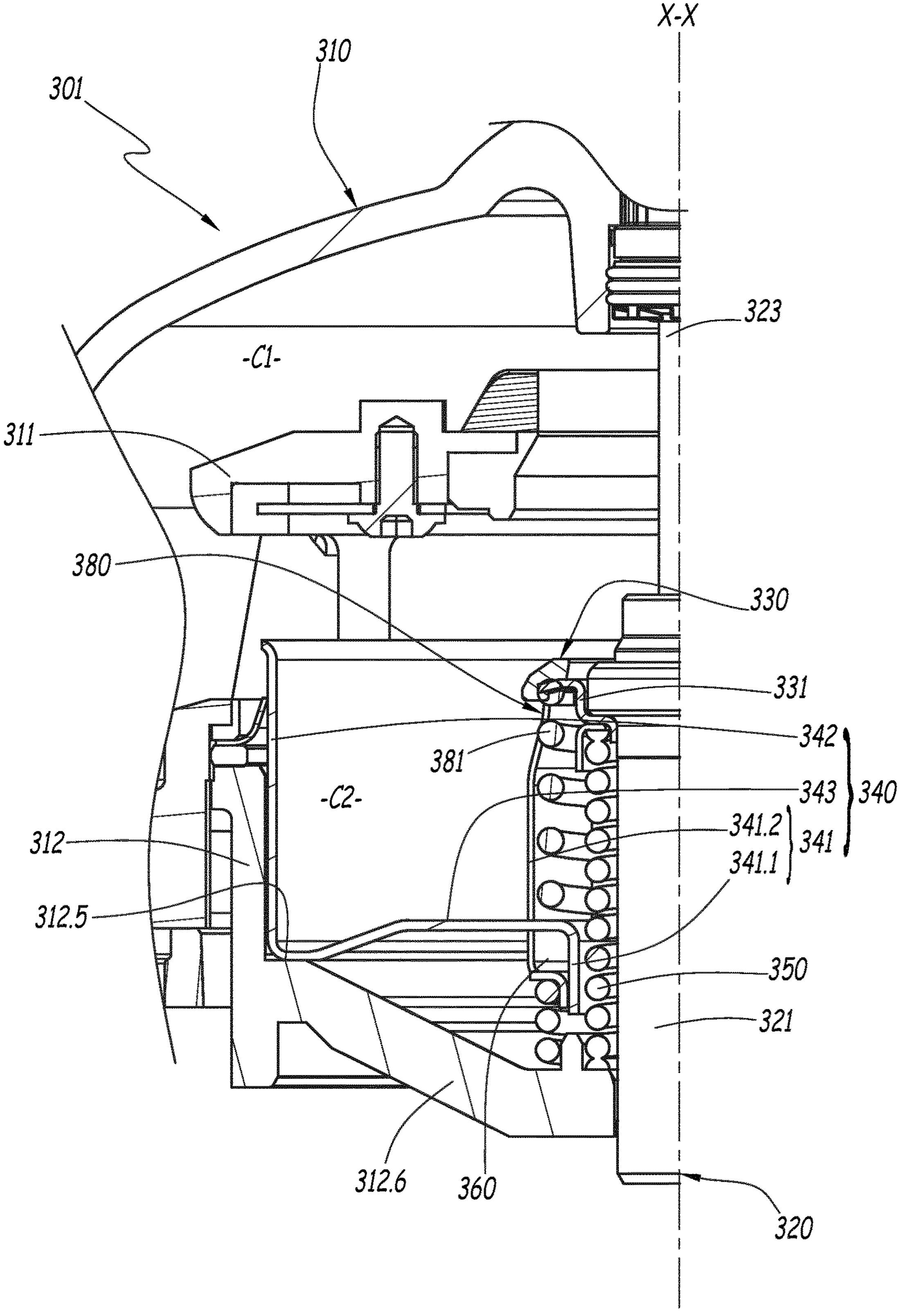
FIG. 12 is a fourth view similar to FIGS. 9 to 11, but illustrating a state of operation of the valve different from same illustrated by FIGS. 9 to 11, respectively.

Given the above, the thermostatic valve 301 differs from the thermostatic valve 201 by an additional arrangement, namely an overtravel system 380 which, during the expansion of thermally expandable material of the thermostatic element 320, allows the body 321 of the thermostatic element 320 to move away from the piston 323 while the sleeve 340 is pressed axially against the sleeve seat 312.5, as illustrated in FIG. 12. More precisely, in the embodiment envisaged in FIGS. 8 to 12, the overtravel system 380 comprises an overtravel spring 381 which is associated with dedicated arrangements of the sleeve 340. The sleeve 340 thereby includes a frame 341, a cylindrical skirt 342 and arms 343, which are functionally similar to the frame 41, the cylindrical skirt 42 and to the arms 43 of the sleeve 40, respectively, but which differ structurally therefrom in that:

the arms 343 connect the armature 341 and the cylindrical skirt 342 at the axial end of the latter, which cooperates by axial bearing with the sleeve seat 312.5 when the sleeve is in the second configuration thereof, and the armature 341 includes a first part 341.1, which is fixedly connected to the cylindrical skirt 342 by the arms 343, and a second part 341.2, which can be displaced along the axis X-X with respect to the first part 341.1, being connected to the latter by the overtravel spring 381 so that, as long as the sleeve 340 is not bearing axially against the sleeve seat 312.5, the first part 341.1 and the second part 341.2 of the armature 341 are kinematically connected to each other, as in FIGS. 8 and 11, whereas, when the sleeve 340 bears axially against the sleeve seat 312.5, the second part 341.2 is freely movable along the axis X-X with respect to the first part 341.1 of the armature 341, as in FIG. 12.

In practice, the overtravel spring 381 has a much greater stiffness than the return spring 360 and is interposed axially between the first part 341.1 and the second part 341.2 of the armature 341 whereas the return spring 360 is interposed axially between the second part 341.2 of the armature 341 and the support part 312.6 of the housing 310. In addition, herein the valve 330 includes an armature 331, which is similar to the armature 31 of the plug 30 and around which the second part 341.2 of the armature 341 is mounted in a similar manner to the mounting of the armature 41 of the sleeve 40 around the armature 31 of the plug 30. Thereby, during the expansion of the thermally expandable material of the thermostatic element 320, the plug 330 changes from the closed configuration thereof shown in FIGS. 8 and 9 to the intermediate position of the open configuration thereof shown in FIG. 10 by means of the driving of the plug 330 by the thermostatic element 320 and the free axial sliding of the armature 331 thereof with respect to the second part 341.2 of the armature 341 of the sleeve 340 which remains immobile in the first configuration thereof. Then, when the thermally expandable material of the thermostatic element 320 continues to expand, the sleeve 340 changes from the first configuration thereof shown in FIG. 10 to the second configuration thereof shown in FIG. 11, by means of the axial bearing of the armature 331 of the plug 330 driven by the thermostatic element 320 against the second part 341.2 of the armature 341 of the sleeve 340 and the kinematic connection between the first part 341.1 and the second part 341.2 of the armature 341 by the overtravel spring 381. Then, when the thermally expandable material of the thermostatic element 320 continues to expand further, the sleeve 340 is immobilized with respect to the housing 310 because of the axial bearing thereof against the sleeve seat 312.5, except the second part 341.2 of the armature 341 thereof, the part 341.2 being, together with the valve 330, axially driven by the thermostatic element 320, by means of the crushing of the overtravel spring 381, as illustrated in FIG. 12.

It should be understood that the support part 312.6 of the housing 310 facilitates the integration of the overtravel system 380 into the valve 301. Given the above, in practice, the embodiment of the overtravel system 380, illustrated in FIGS. 8 to 12, is not limiting, many other embodiments being conceivable for the overtravel system 380, including in the absence of a support part similar to the support part 312.6, having instead a support bracket similar to the support bracket 70 or 170.

Various arrangements and variants of the thermostatic valves 1, 101, 201, and 301 described so far are conceivable. Examples include:

the electric heating resistance 24 and the arrangements associated with the latter can be eliminated; in such case, the thermostatic element is controlled in expansion only by the heat of the fluid wherein the body thereof is immersed;

the geometry of the housing 10, 110, 210 or 310 can be modified with respect to the geometry envisaged in the figures, in particular to adapt to the installation environment of the thermostatic valve 1, 101, 201, 301 and/or to facilitate the manufacture thereof and/or to adapt to other directions of flow of the fluid in the thermostatic valve with respect to the channels V1, V2 and V3; and/or the thermostatic element 20, 120, 220 or 320 can be functionally connected to the rest of the thermostatic valve 1, 101, 201, 301 in the opposite way to the way considered in the figures; in other words, in such case, it is the body of the thermostatic element which is fixedly connected to the housing 10, 110, 210, 310, whereas the piston of the thermostatic element drives the plug 30, 130, 230, 330 and the sleeve 40, 140, 240, 340.

Finally, according to a variant (not shown), the thermostatic valve 1, 101, 201 or 301 has no orifices 12.4, 112.4, 212.4, 312.4 and, more generally, no arrangement for regulating a flow of fluid via such orifices by means of the uncovering/covering radially to the axis X-X, by the sleeve 40, 140, 240, 340.

What is claimed is:

1. A thermostatic valve, comprising:

a housing, wherein first and second chambers are arranged inside the housing, the first chamber is configured to be directly connected to the second chamber so that a fluid flows inside the housing, and the first and second chambers are each configured to be connected directly to an outside of the housing so that a fluid enters the housing and/or leaves the housing via the respective chamber, a plug seat fixedly supported by the housing;

a first sleeve seat fixedly supported by the housing and distinct from the plug seat;

a thermostatic element comprising a fixed part secured to the housing, and a movable part configured to move along an axis relative to the fixed part, the movable part axially moving away from the fixed part under an action of an expansion of a thermally expandable material of the thermostatic element;

a plug configured to move along the axis relative to the housing in order to change between a closed configuration wherein the plug is axially pressed against the plug seat to prevent the fluid from flowing between the first and second chambers by passing through the plug seat, and an open configuration wherein the plug is moved away from the plug seat to let the fluid flow between the first and second chambers by passing through the plug seat; and a sleeve configured to move along the axis relative to the housing to change between a first configuration wherein the sleeve is pressed axially against the first sleeve seat to prevent the fluid from flowing between the first and second chambers by passing through the first sleeve seat, and a second configuration wherein the sleeve is moved away from the first sleeve seat to let the fluid flow between the first and second chambers by passing through the first sleeve seat, wherein the plug is connected to the movable part of the thermostatic element and to the sleeve so that during the expansion of the thermally expandable material:

the movable part drives the plug along the axis with respect to the housing from the closed configuration to the open configuration, until the plug occupies a predetermined intermediate position, while the sleeve remains in the first configuration thereof, then the movable part drives the plug in the open configuration along the axis with respect to the housing beyond the predetermined intermediate position, while the plug drives the sleeve along the axis with respect to the housing from the first configuration to the second configuration.

2. The thermostatic valve according to claim 1, wherein, in an orthogonal projection onto a geometric plane perpendicular to the axis, the plug seat is inscribed inside the first sleeve seat.

3. The thermostatic valve according to claim 1, wherein the plug is secured along the axis to the movable part of the thermostatic element, wherein the plug is configured to freely slide relative to the sleeve along the axis when the plug is driven between the closed configuration and the predetermined intermediate position, so that the sleeve remains in the first configuration thereof, and wherein the plug is configured to be secured to the sleeve when the plug is in the open configuration and beyond the predetermined intermediate position, so that the plug drives the sleeve along the axis with respect to the housing from the first configuration to the second configuration.

4. The thermostatic valve according to claim 3, wherein the plug has an armature directly mounted around the movable part of the thermostatic element securely along the axis, and wherein the sleeve comprises an armature mounted around the armature of the plug to leave freely sliding, along the axis, the armature of the sleeve and the armature of the plug one with respect to the other when the thermostatic valve is driven between the closed configuration and the predetermined intermediate position, and to immobilize along the axis the armature of the sleeve relative to the armature of the plug, by an axial bearing when the thermostatic valve in the open configuration when the thermostatic valve is driven beyond the predetermined intermediate position.

5. The thermostatic valve according to claim 1, wherein the thermostatic valve further includes:

a first return spring compressed along the axis and interposed, directly or indirectly, between the housing and the plug to drive the plug from the open configuration to the closed configuration during a contraction of the thermally expandable material, and a second return spring compressed along the axis and interposed, directly or indirectly, between the housing and the sleeve to drive the sleeve from the second configuration to the first configuration during the contraction of the thermally expandable material.

6. The thermostatic valve according to claim 5, wherein the thermostatic valve comprises a support bracket, wherein the first return spring and the second return spring are axially pressed against said support bracket, said support bracket being secured to the housing and extending parallel to the axis from the housing inside the sleeve.

7. The thermostatic valve according to claim 5, wherein the housing incorporates a support part, wherein the first return spring and the second return spring are axially pressed against said support part, said support part extending transversely to the axis and being arranged entirely outside the sleeve.

8. The thermostatic valve according to claim 1, wherein the housing is provided with at least one orifice, wherein said at least one orifice:

connects the second chamber and the outside of the housing along a direction radial to the axis, is left uncovered by the sleeve in the first configuration to allow the fluid to flow radially to the axis between the second chamber and the outside of the housing via said at least one orifice, and is covered, along the direction radial to the axis, by the sleeve in the second configuration to prevent the fluid from flowing radially to the axis between the second chamber and the outside of the housing via said at least one orifice.

9. The thermostatic valve according to claim 8, wherein the housing fixedly supports a second sleeve seat, wherein the sleeve in the first configuration is moved away from the second sleeve seat, and wherein, during the expansion of the thermally expandable material, the sleeve in the second configuration is axially driven relative to the housing by the plug until bearing axially against the second sleeve seat to prevent the fluid from flowing between the second chamber and said at least one orifice by passing through the second sleeve seat.

10. The thermostatic valve according to claim 9, wherein the thermostatic valve comprises an overtravel system allowing the movable part to move away from the fixed part of the thermostatic element while the sleeve is axially pressed against the second sleeve seat, during the expansion of the thermally expandable material.

11. The thermostatic valve according to claim 1, wherein the housing is provided with a deflector, breaking fluid flows grazing the plug seat transversally to the axis.

* * * * *